United States Patent Office 3,397,147
Patented Aug. 13, 1968

3,397,147
ELECTROVISCOUS FLUID COMPOSITION
Thomas W. Martinek, Danville, Ill., assignor to Union Oil Company of California, Los Angeles, Calif., a corporation of California
No Drawing. Continuation-in-part of application Ser. No. 248,227, Dec. 31, 1962. This application Jan. 10, 1968, Ser. No. 696,698
8 Claims. (Cl. 252—78)

ABSTRACT OF THE DISCLOSURE

An electroviscous fluid comprising a non-polar oleaginous vehicle, such as a mineral oil, and a particulate solid consisting of silica particles having partially esterified surfaces. The fluid may also contain other ingredients such as a surface active agent, an amine and water.

---

This application is a continuation-in-part of application Ser. No. 248,227, filed Dec. 31, 1962, and now abandoned.

This invention relates to an improved silica-base electric field-responsive composition. More particularly, the invention relates to an electric field-responsive composition formulated from silica particles the surfaces of which have been partially esterified by reaction with a glycerol ester.

It is known that certain fluids respond to the influence of an electric potential by evidencing an apparent and pronounced increase in bulk viscosity. This phenomenon is reversible and the compositions revert to their initial viscosity when the electric field is removed. Such fluids have been termed electroviscous fluids and are described in U.S. Patents 2,661,596, 2,661,825 and 3,047,507. These fluids are commonly used in clutches, wherein the fluid is disposed between the surfaces of two electrically conductive members and electric potential is imposed across the two members. The electro-viscous fluid responds to the application of an electric potential by instantaneously, but reversibly, changing in apparent bulk viscosity. In strong fields, the fluid thickens into a solid or semisolid condition, whereby torque can be transmitted between the surfaces of the clutch members.

It is further known that certain electroviscous fluids, when exposed to an alternating electric field, exhibit a similar change in bulk viscosity, even though the fluid is not in contact with the potential-carrying electrodes. This phenomenon is used in chucking devices, by means of which conductive objects can be secured with an electroviscous fluid film. It is further known that by incorporating a suitable quantity of a finely divided, particulate, conductive material in the fluid used with an alternating-field chucking device, non-metallic, non-conductive objects can be secured with about the same efficiency with which non-conductive electroviscous fluids can be used to secure conductive objects.

Electroviscous fluids have found only limited commercial application, largely because of their relatively low holding power and the instability of the fluids known to the prior art. Such fluids suffered from serious disadvantages in that the change in apparent viscosity on exposure to an electric field was insufficient to securely couple the driving and driven elements of clutches so that the torque transmitted could satisfy practical requirements. Moreover, the fluids of the prior art tended to deteriorate so that the forces that could be transmitted through the fluids gradually decreased to very low values. Also, phase separation of the fluids frequently occurred upon storage, rendering them useless. The rate of deterioration of prior art fluids is accelerated by storage or operation at temperatures above ambient temperatures. For example, fluids of the prior art were known to deteriorate, upon storage for as short a period as a week at temperatures of about 150° F., to such an extent as to render the fluids useless.

It is, therefore, a primary object of this invention to provide electroviscous fluid compositions capable of displaying great change in apparent bulk viscosity upon exposure to an electric field, thereby enhancing the force-transmitting characteristics of couplings or clutches with which the fluids may be employed. Another object of this invention is to provide electroviscous fluid compositions of outstanding initial electro-activity which can be stored for long periods of time without deterioration, phase separation or reduction in electro-activity.

Electroviscous fluid compositions of the prior art comprise mixtures of fine particulate material, such as silica, an electrically stable oleaginous vehicle of high resistivity, a surface active agent, water, and minor amounts of sundry other ingredients. In accordance with the present invention, excellent electroviscous fluid compositions are formulated using partially esterified silica as the particulate solid.

It is known that silica may contain chemically bound water in the form of hydroxyl groups linked to silicon atoms. It is further known that high-surface-area silicas are capable of absorbing or holding varying quantities of water which are not chemically bound to the silica. This water, which may be physically bound or absorbed by the silica, will herein be designated "free water." It is also known that chemically bound water, existing as hydroxyl (silanol) groups linked to silicon atoms at the surface of the silica particles, may be reacted with mono-hydroxy alcohols to eliminate water and form an esterified silica surface, the product being termed an "estersil." The product, starting materials, and reaction conditions are described in U.S. Patent 2,657,149. Similar products prepared by reaction with glycols are described in U.S. Patent 2,739,076.

In accordance with the present invention the particulate solid component of the electroviscous fluid composition consists of silica the surface of which has not less than about two silica-bonded hydroxyl groups per square millimicron of silica surface and about 0.5 to 1.5 silica-bonded

groups per square millimicron of silica surface. Such esterified silicas are produced by reacting silica having not less than about 2.5 silica bonded hydroxyl groups per square millimicron of surface, and preferably about 6 silica bonded hydroxyl groups per square millimicron, with a monoester of glycerol. The silica originally may contain free water in an amount not in excess of about 1 molecule per square millimicron of surface area, but preferably will contain little if any free water. Water of reaction is preferably removed as the reaction proceeds. The particulate solids product is essentially a partial surface ester of an acid silica and the glycerol ester.

Such esterified silicas are readily prepared by reacting a less-than-stoichiometric amount of the glycerol ester with particulate silica having at least 2.5 silica-bonded hydroxyl (acidic) groups per square millimicron of silica surface in the presence of an inert azeotroping agent, such as toluene, at temperatures of about 100 to 150° C. By-product water is removed by the azeotrope and the esterified silica product is characterized by the presence of some unreacted silica-bonded hydroxyl groups and some ester groupings probably having pendant unreacted hydroxyl groups.

As described above, the partial esterification of the silica particles results in formation of

groups on the surface of the silica. R in this formula is a saturated or unsaturated hydrocarbon radical containing from about 6 to 22 carbon atoms. R may also contain substituents such as hydroxyl, alkyl or other radicals. Examples of suitable ester starting materials are glycerol monoesters of saturated or unsaturated fatty acids or hydroxy substituted fatty acids, such as:

glycerol monooleate
glycerol monocaproate
glycerol monoundecanoate
glycerol monolaurate
glycerol monotridecanoate
glycerol monopentadecanoate
glycerol monopalmitate
glycerol monomargarate
glycerol monostearate
glycerol monononadecanoate
glycerol monoheneicosanoate
glycerol monobehenate
glycerol monolinoleate
glycerol monoricinoleate
glycerol monopalmitoleate Esters formed by the reaction of mixtures of such acids (palm oil fatty acid, coco fatty acids, castor oil fatty acids, etc.), either synthetic or naturally occurring, can also be used.

The silica starting material may be porous or non-porous, and of high or low surface area, i.e., 2 to 1000 square meters per gram. The silica should have at least 2.5 silica-bonded hydroxyl groups, and preferably 6 or more, per square millimicron of surface area. Particle sizes in the range of 0.04 to 10 microns are suitable, 0.06 to 2.0 being preferred.

It has been found that it is very difficult to produce by prior art techniques a partially esterified silica suitable for use in electroviscous fluids. In order to make a product having 2 unreacted silanol groups per square millimicron of silica surface the silica starting material must obviously have more than 2 silanol groups per square millimicron. When excess ester reactant is used it is difficult to control the reaction time and temperature to get the desired degree of esterification. On the other hand, when the quantity of ester reactant is reduced to the amount required to give the desired degree of esterification there is insufficient reactant to uniformly wet the silica. An unmanageable, agglomerated mass of unevenly treated silica results.

It has been found that these difficulties can be overcome by employing a less-than-stoichiometric amount of ester reactant in admixture with an inert solvent for the ester. The solvent can also be a material which forms an azeotrope with water, so that water produced in the reaction can be conveniently removed. Toluene is a preferred solvent and azeotroping agent. Thus, in accordance with this invention, the calculated amount of ester to produce 0.5 to 1.5 silica-ester links per square millimicron of silica surface is reacted in the presence of an inert azeotroping agent at temperatures of about 100°–150° C. for a time sufficient to permit substantially complete reaction of the ester. By-product water is removed by the azeotrope and the product silica is characterized by the presence of at least 2 unreacted silanol groups and some esterified groups, the degree of esterification being controlled by the quantity of ester reacted, calculated in terms of molecules per square millimicron of silica surface area. Alternatively, since the reaction proceeds in a controllable manner when less-than-stoichiometric quantities of the ester are used, the reaction can be terminated before completion to give a lesser but still controllable degree of esterification.

Electroviscous fluids compounded in accordance with this invention include, in addition to the esterified silica, a high-resistivity oleaginous vehicle having a dielectric constant not greater than about ten, preferably in the range of about two to five, and may contain an amount of a surface active agent sufficient to render the composition fluid or thixotropic. Where the electroviscous fluid is to display greater electro-activity in the presence of both transient and constant potentials, the fluid may also contain an amine. The amount of amine required will be dependent upon the surface area and pore volume of the silica and the molecular weight and density of the amine. The presence of such a compound frequently enhances the electro-activity in the presence of a field of constant potential. It will be evident to those skilled in the art that the amine and the surface active agent may, in fact, be a single additive which provides both functions, but it is preferred that at least about 20 percent of the total surface active agent be substantially neutral (neither acidic nor basic) surface active agent.

Electroviscous fluids of the invention will contain in excess of about 10 percent by volume of esterified silica, and usually about 20 to 60 percent by volume of esterified silica. At volumes below about 10 percent, only very low forces are obtained. It has been found that highest forces are obtained when the amount of silica is sufficient to provide in the fluid an average particle spacing of about 0.01 to 0.03 micron between particles. The volume of silica required is dependent upon the silica particle size, and can be calculated from the formula:

$$Y = D\left(\frac{0.806}{\phi^{1/3}} - 1\right)$$

where:

Y is the average distance between particles,
D is the average particle diameter, and
$\phi$ is the volume fraction of silica in the electrofluid.

The volume fraction, which is expressed as a decimal number, is merely the ratio of the volume of the silica to the volume of the fluid compounded therefrom. It is calculated on the basis of "enclosed volume," which is the volume which would be bounded by the exterior surfaces of a particle, assuming the surface to be non-porous. Enclosed volume may be calculated on the basis of the density only for non-porous particles, or on the basis of skeletal density and pore volume for porous particles. Thus the volume of a quantity of silica, whether porous or non-porous, is the sum of the volumes of the particles, taken as above described. This is obviously less than the volume which the quantity of silica will occupy in a dry measure.

The oleaginous vehicle in which the esterified silica is dispersed is preferably a refined mineral oil fraction having a viscosity within the range of about 30 to 300 SUS at 100° F., and an initial boiling point greater than about 400° F. A wide variety of non-polar oleaginous materials having a dielectric constant not greater than about 5, and which are only weakly adsorbed by silica, can be employed. Examples of suitable materials include white oils, lubricating oil stocks such as 85 vis neutral oil, and various synthetic oils. Examples of synthetic oils which may be employed are those such as are commonly used as transformer oils, and synthetic oils resulting from polymerization of unsaturated hydrocarbons, polyfluoro derivatives, or organic compounds, especially fluorinated hydrocarbons or polyesters in the lubricating-oil viscosity range. The vehicle is preferably a material which is only weakly adsorbed by silica, such as paraffins, olefins, and aromatic hydrocarbons. The vehicle can be considered to be only weakly adsorbed when it is less strongly absorbed by the silica employed in the fluid than are the other constituents of the fluid, i.e., the surfactant and nitrogen compound, if employed.

When partially esterified silica is incorporated in a suitable oleaginous vehicle the silica thickens the vehicle to a certain extent. At high silica-volume fractions the mixture may take on the characteristics of a heavy grease, depending on the degree of esterification, chain length of the ester group and residual silanol content. Where volumes of silica in the preferred range, i.e., sufficient to provide a particle spacing of about 0.01 to 0.03 micron, are incorporated in the fluid and the degree of esterification is below about 0.7 molecule per square millimicron, it is usually necessary to add a material to fluidize the mixture and keep the viscosity of the product at a reasonable level. For this purpose varying amounts of a neutral surfactant can be incorporated to maintain the mixture of silica and vehicle as a fluid, or thixotropic suspension. Suitable surface active agents include anionic, cationic and nonionic agents. Anionic agents include alkyl aryl sulfonates such as dodecylbenzenesulfonate, sulfated alcohols and salts thereof such as oleyl and lauryl alcohol sulfates, sodium tetradecyl, heptadecyl and 2-ethylhexyl sulfates, esters of sodium sulfosuccinic acid such as sodium dialkylsulfosuccinate, sodium salts of sulfated monoglycerides such as the sodium salt of the sulfated glyceride of coconut oil fatty acids, etc.

Cationic agents include quaternary ammonium salts and salts of higher alkyl amines such as octadecyldimethylbenzyl ammonium chloride and lauryl pyridinium chloride.

Nonionic agents include ethers and esters formed by reaction of ethylene oxide with a variety of compounds such as fatty alcohols, alkyl phenols, glycol ethers, fatty acids, rosin acids, tall oil, fatty acid esters of sorbitol, fatty amides and fatty amines, e.g., the reaction product of nonyl phenol and from about 4 to 12 moles of ethylene oxide. Other nonionic agents are the fatty acid esters of polyhydroxy alcohols such as glycerol and sorbitol. Examples are glycerol monooleate, sorbitol mono, sesqui or trioleate, mono or tristearate and monolaurate or monopalmitate.

Other suitable surface active agents include fatty alcohols, such as octyl and dodecyl alcohols, and amine compounds such as 1-hydroxyethyl 2-heptadecenyl imidazoline.

Although any of the above-described surface active agents may be used in the compositions of the invention, they are not necessarily equivalent. The most effective surface active agent for a particular electroviscous fluid composition is best determined experimentally. The surface active agent should be added in quantities sufficient to fluidize the mixture of vehicle and esterified silica but not greatly in excess of this amount. Excessive amounts of surface active agent may decrease the electro-activity of the product. However, suitable amounts of surface active agent may, in addition to fluidizing the mixture (probably by acting as a dispersing agent for the particulate material) also enhance the response of the fluid to an electric field, either AC or DC. Proportions of surface active agent will generally range from about 5 percent to about 25 percent, usually not over 15 percent, by volume of the total composition. The optimum amount of surface active agent depends upon the type and amount of esterified silica, particle surface area, particle size, water content, and the fluid consistency desired.

As stated above, where the electroviscous fluid is intended for activation by a constant potential it may be advantageous to incorporate in the fluid about 0.1 to 25 percent, preferably not more than about 10 percent, by volume, of an amine. The amine may be a substituted or non-substituted aliphatic, aromatic or heterocyclic amine. It may be high or low in molecular weight, may or may not have fluidizing properties, and can contain other functional groups. Suitable compounds include primary, secondary, and tertiary amines, aminoalcohols, aminoethers, and diamines having about 1 to 16 carbon atoms. Examples are methyl amine, butyl amine, octyl amine, dodecyl amine, hexadecyl amine, diethyl amine, diisopropyl amine, dibutyl amine, ethanol amine, propanol amine, ethoxyethyl amine, dioctyl amine, trimethyl amine, triethyl amine, tributyl amine, ethylene diamine and propylene diamine. Suitable heterocyclic amines include substituted and unsubstituted pyridine, morpholine and imidazolene. Again, the above-disclosed compounds (amines) will not necessarily be equivalent in a given electroviscous fluid composition and the most effective compound is best determined experimentally. 1-hydroxyethyl 2-heptadecyl imidazolene has, however, been found particularly effective in certain fluid compositions and its use is illustrated in the examples below.

In compounding the electroviscous fluids any fluidizer used is preferably first blended with any other organic components to be incorporated in the fluid, and the organic components are thoroughly mixed. The esterified silica is then added as rapidly as possible to the blend of organic ingredients, preferably over a blending period of less than one hour. The mixture may then be milled in a three-roll mill until it is fluid and uniform.

The invention will be more specifically illustrated by the following examples.

Example I

A 538 g. portion of silica having 7 wt. percent water with 6 silanols per square millimicron (745 square meters/gram) was charged to a 5000 ml. 3-necked flask equipped with a stirrer, thermometer, and modified Dean-Stark water trap. A 2500 ml. portion of toluene and 221 g. (0.62 mole) of glycerol monooleate were added. The mixture was refluxed for a total of 45 hours. The reaction was followed by plotting the volume of water removed by the trap at regular intervals. When reaction was complete, as evidenced by no more water removal, the mixture was cooled and the silica was filtered and washed with toluene several times. The filtrate was distilled and reacted glycerol monooleate recovered as residue.

In the foregoing procedure the quantity of glycerol monooleate used represented one molecule per square millimicron of silica surface area. The reaction proceeded to the point at which about 0.61 molecule per square millimicron reacted. The reaction and dehydration during reaction resulted in a reduction of the silica bonded hydroxyl groups from about 6 to about 3.9 per square millimicron of silica surface.

Using the esterified silica thus produced an electroviscous fluid of the following composition was compounded:

| Component: | Percent by weight |
|---|---|
| Esterified silica (1.71% $H_2O$, 12.93% reacted glycerol-monooleate) | 63.63 |
| 1-hydroxyethyl 2-heptadecylimidazolene | 5.27 |
| Mineral Seal Oil | 31.10 |

The fluid was tested on an AC chuck under standard conditions and found to display a holding force of 57 ounces per square inch upon application of a 60 cycle, 3 phase electrical field of 100 kilovolt per inch.

Example II

The same silica as described in Example I was used to make an electroviscous fluid containing no basic nitrogen compound. 65.11 grams of the esterified silica was added to a blend of 3.07 grams of glycerol monooleate in 31.82 grams of Mineral Seal Oil. The resulting mixture was then passed through a three-roll laboratory paint mill whereupon it became a fluid having a viscosity of 500 centipoises at 26° C. AC forces of 40–50 ounces per square inch and DC forces of 15–20 ounces per square inch were obtained upon the application of a 200 kilovolts per inch electrical field.

I claim:

1. An electroviscous fluid consisting essentially of a non-polar oleaginous vehicle having a dielectric constant not greater than about ten and from about 10 to 60 volume percent of a particulate silica whose surfaces have not less than about 2 silica-bonded hydroxyl groups per square millimicron of surface area and from about 0.5 to 1.5 silica-bonded

groups per square millimicron of surface area, where R is a saturated or unsaturated hydrocarbon radical having from about 6 to 22 carbon atoms.

2. The fluid of claim 1 in which the oleaginous vehicle is a mineral oil.

3. The fluid of claim 1 in which R in the formula is the oleate radical.

4. The fluid of claim 1 additionally containing an anionic, cationic or nonionic surface active agent in an amount just sufficient to render the composition fluid.

5. The fluid of claim 4 in which the surface active agent is glycerol monooleate.

6. The fluid of claim 1 additionally containing an amine in an amount of about 0.1 to 25 percent by volume.

7. The fluid of claim 6 in which the amine is 1-hydroxyethyl 2-heptadecyl imidazolene.

8. The fluid of claim 1 additionally containing free water in an amount less than about 3 weight percent.

No references cited.

LEON D. ROSDOL, *Primary Examiner.*

S. D. SCHWARTZ, *Assistant Examiner.*